US006975985B2

(12) United States Patent
Kriechbaum et al.

(10) Patent No.: US 6,975,985 B2
(45) Date of Patent: Dec. 13, 2005

(54) METHOD AND SYSTEM FOR THE AUTOMATIC AMENDMENT OF SPEECH RECOGNITION VOCABULARIES

(75) Inventors: Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 09/994,396

(22) Filed: Nov. 26, 2001

(65) Prior Publication Data

US 2002/0065653 A1 May 30, 2002

(30) Foreign Application Priority Data

Nov. 29, 2000 (EP) .................................. 00127484

(51) Int. Cl.[7] .............................................. G10L 15/00

(52) U.S. Cl. ....................... 704/231; 704/260; 704/252

(58) Field of Search ................................ 704/235, 254, 704/260, 252

(56) References Cited

U.S. PATENT DOCUMENTS

| | | | | |
|---|---|---|---|---|
| 6,064,957 A * | 5/2000 | Brandow et al. | ........... | 704/235 |
| 6,076,059 A * | 6/2000 | Glickman et al. | .......... | 704/260 |
| 6,078,885 A | 6/2000 | Beutnagel | ................... | 704/258 |
| 6,466,907 B1 * | 10/2002 | Ferrieux et al. | ............ | 704/254 |

* cited by examiner

*Primary Examiner*—W. R. Young
*Assistant Examiner*—Huyen X. Vo
(74) *Attorney, Agent, or Firm*—Akerman Senterfitt

(57) ABSTRACT

The present invention provides a method and system to improve speech recognition using an existing audio realization of a spoken text and a true textual representation of the spoken text. The audio realization and the true textual representation can be aligned to reveal time stamps. A speech recognition can be performed on the audio realization to provide a hypothesis textual representation for the audio realization. The aligned true textual representation can be compared with the hypothesis textual representation. Single word pairs from the true and the hypothesis textual representations can be selected where the representations are different. Similarly, single word pairs can be selected from each representation where the representations are identical. A word or pronunciation database can be updated using the selected single word pairs together with the corresponding aligned audio realization.

18 Claims, 5 Drawing Sheets

600 610 620 630

| Representation | Transcript | Start | Stop |
|---|---|---|---|
| Versuch | das tue | 1137 | 1436 |
| ich | ich | 1436 | 1666 |
| wohl | wohl | 1666 | 1925 |
| euch | euch | 1925 | 2244 |
| diesmal | diesmal | 2244 | 2789 |
| festzuhalten Fuehl | ist es zu alt zum Kueche | 2789 | 6305 |
| ich | ich | 6305 | 6375 |
| mein Herz | merkst | 6375 | 7004 |
| noch | noch | 7004 | 7473 |
| jenem | jenem | 7473 | 8281 |
| Wahn | Mann | 8281 | 8730 |
| geneigt | geneigt | 8730 | 9258 |

700 710 720 730 740

| Representation | Transcript | Start | Stop | 1-1 |
|---|---|---|---|---|
| Versuch | das tue | 1137 | 1436 | 0 |
| ich | ich | 1436 | 1666 | 1 |
| wohl | wohl | 1666 | 1925 | 1 |
| euch | euch | 1925 | 2244 | 1 |
| diesmal | diesmal | 2244 | 2789 | 1 |
| festzuhalten Fuehl | ist es zu alt zum Kueche | 2789 | 6305 | 0 |
| ich | ich | 6305 | 6375 | 1 |
| mein Herz | merkst | 6375 | 7004 | 0 |
| noch | noch | 7004 | 7473 | 1 |
| jenem | jenem | 7473 | 8281 | 1 |
| Wahn | Mann | 8281 | 8730 | 1 |
| geneigt | geneigt | 8730 | 9258 | 1 |

FIG. 6

| Representation | Transcript | Start | Stop | 1-1 |
|---|---|---|---|---|
| Wahn | Mann | 8281 | 8730 | 1 |

FIG. 7

| Representation | Transcript | Start | Stop | 1-1 |
|---|---|---|---|---|
| ich | ich | 1436 | 1666 | 1 |
| wohl | wohl | 1666 | 1925 | 1 |
| euch | euch | 1925 | 2244 | 1 |
| diesmal | diesmal | 2244 | 2789 | 1 |
| ich | ich | 6305 | 6375 | 1 |
| noch | noch | 7004 | 7473 | 1 |
| jenem | jenem | 7473 | 8281 | 1 |
| geneigt | geneigt | 8730 | 9258 | 1 |

FIG. 8

METHOD AND SYSTEM FOR THE AUTOMATIC AMENDMENT OF SPEECH RECOGNITION VOCABULARIES

CROSS-REFERENCE TO RELATED APPLICATIONS

This application claims the benefit of European Application No. 00127484.4, filed Nov. 29, 2000 at the European Patent Office.

BACKGROUND OF THE INVENTION

1. Technical Field

The invention generally relates to the field of computer-assisted or computer-based speech recognition, and more specifically, to a method and system for improving recognition quality of a speech recognition system.

2. Description of the Related Art

Conventional speech recognition systems (SRSs), in a very simplified view, can include a database of word pronunciations linked with word spellings. Other supplementary mechanisms can be used to exploit relevant features of a language and the context of an utterance. These mechanisms can make a transcription more robust. Such elaborate mechanisms, however, will not prevent a SRS from failing to accurately recognize a spoken word when the database of words does not contain the word, or when a speaker's pronunciation of the word does not agree with the pronunciation entry in the database. Therefore, collecting and extending vocabularies is of prime importance for the improvement of SRSs.

Presently, vocabularies for SRSs are based on the analysis of large corpora of written documents. For languages where the correspondence between written and spoken language is not bijective, pronunciations have to be entered manually. This is a laborious and costly procedure.

U.S. Pat. No. 6,064,957 discloses a mechanism for improving speech recognition through text-based linguistic post-processing. Text data generated from a SRS and a corresponding true transcript of the speech recognition text data are collected and aligned by means of a text aligner. From the differences in alignment, a plurality of correction rules are generated by means of a rule generator coupled to the text aligner. The correction rules are then applied by a rule administrator to new text data generated from the SRS. The mechanism performs only a text-to-text alignment, and thus does not take the particular pronunciation of the spoken text into account. Accordingly, it needs the aforementioned rule administrator to apply the rules to new text data. The mechanism therefore cannot be executed fully automatically.

U.S. Pat. No. 6,078,885 discloses a technique which provides for verbal dictionary updates by end-users of the SRS. In particular, a user can revise the phonetic transcription of words in a phonetic dictionary, or add transcriptions for words not present in the dictionary. The method determines the phonetic transcription based on the word's spelling and the recorded preferred pronunciation, and updates the dictionary accordingly. Recognition performance is improved through the use of the updated dictionary.

The above discussed techniques, however, share the disadvantage of not being able to update a speech recognition vocabulary on large scale bodies of text with minimal technical effort and time. Accordingly, these techniques are not fully automated.

SUMMARY OF THE INVENTION

It is therefore an object of the present invention to provide method and system for improving the recognition quality and quantity of a speech recognition system. It is another object to provide such a method and system which can be executed or performed automatically. Another object is to provide a method and system for improving the recognition quality with minimum technical effort and time. It is yet another object to provide such a method and system for processing large text corpora for updating a speech recognition vocabulary.

The above objects are solved by the features of the independent claims. Other advantageous embodiments are disclosed within the dependent claims. Speech recognition can be performed on an audio realization of a spoken text to derive a hypothesis textual representation (second representation) of the audio realization. Using the recognition results, the second representation can be compared with an allegedly true textual representation (first representation), i.e. an allegedly correct transcription of the audio realization in a text format, to look for non-recognized single words. These single words then can be used to update a user-dictionary (vocabulary) or pronunciation data obtained by a training of the speech recognition.

It is noted that the true textual representation (true transcript) can be obtained in a digitized format, e.g. using known character recognition (OCR) technology. Further it has been recognized that an automation of the above mentioned mechanism can be achieved by providing a looped procedure where the entire audio realization and both the entire true textual representation and the speech-recognized hypothesis textual representation can be aligned to each other. Accordingly, the true textual representation and the hypothetic textual representation likewise can be aligned to each other. The required information concerning mis-recognized or non-recognized speech segments therefore can be used together with the alignment results in order to locate mis-recognized or non-recognized single words.

Notably, the proposed procedure of identifying isolated mis-recognized or non-recognized words in the entire realization and representation, and to correlate these words in the audio realization, advantageously makes use of an inheritance of the time information from the audio realization and the speech recognized second transcript to the true transcript. Thus, the audio signal and both transcriptions can be used to update a word database, a pronunciation database, or both.

The invention disclosed herein provides an automated vocabulary or dictionary update process. Accordingly, the invention can reduce the costs of vocabulary generation, e.g. of novel vocabulary domains. The adaptation of a speech recognition system to the idiosyncrasies of a specific speaker is currently an interactive process where the speaker has to correct mis-recognized words. The invention disclosed herein also can provide an automated technique for adapting a speech recognition system to a particular speaker.

The invention disclosed herein can provide a method and system for processing large audio or text files. Advantageously, the invention can be used with an average speaker to automatically generate complete vocabularies from the ground up or generate completely new vocabulary domains to extend an existing vocabulary of a speech recognition system.

BRIEF DESCRIPTION OF THE DRAWINGS

There are shown in the drawings embodiments which are presently preferred, it being understood, however, that the invention is not limited to the precise arrangements and instrumentalities shown.

FIG. 6 depicts an exemplary data set output from a classifier in accordance with the inventive arrangements disclosed herein.

FIG. 7 illustrates corresponding data in accordance with a first embodiment of the inventive arrangements disclosed herein.

FIG. 8 illustrates corresponding data in accordance with a second embodiment of the inventive arrangements disclosed herein.

DETAILED DESCRIPTION OF THE INVENTION

Figure 1:
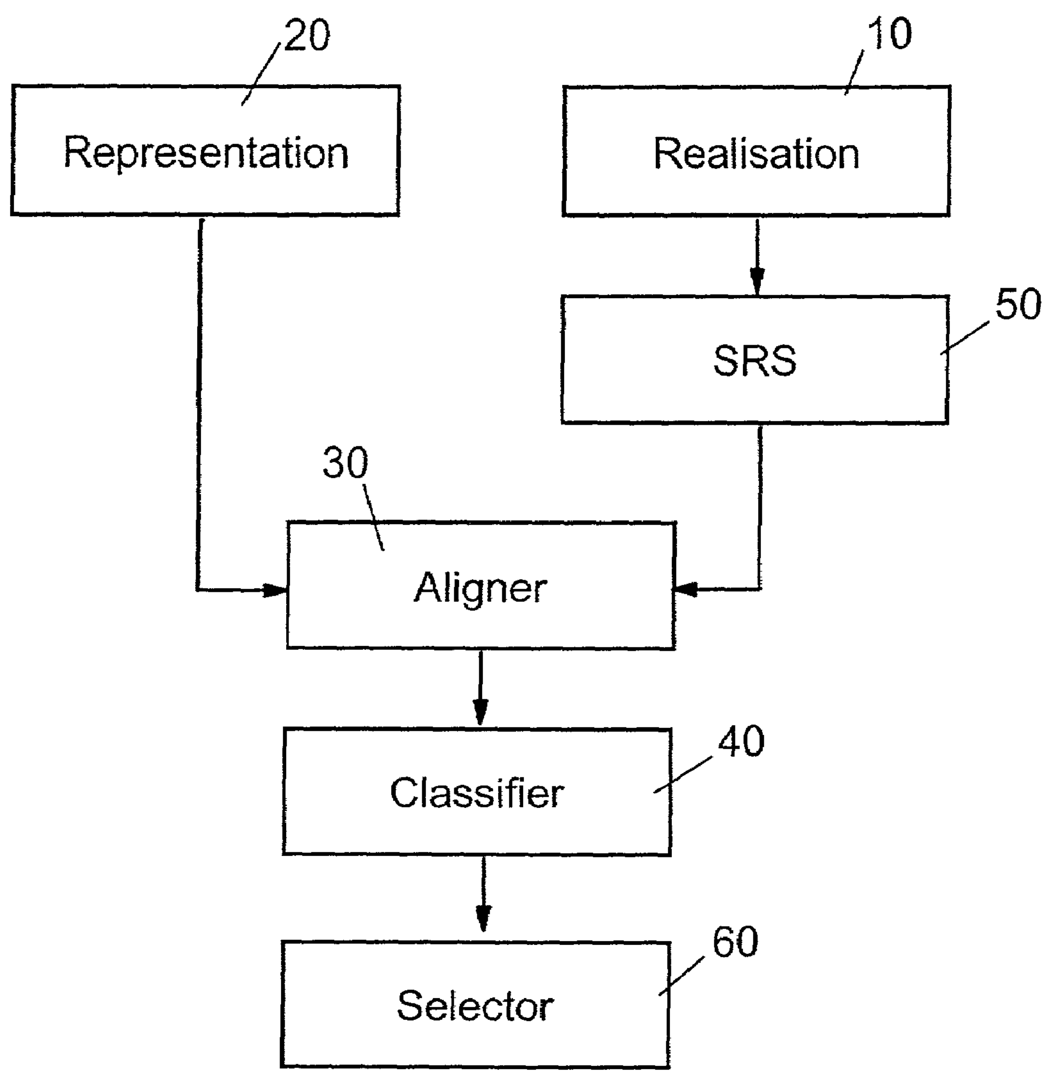
FIG. 1 is a block diagram illustrating a system in accordance with the inventive arrangements disclosed herein.

FIG. 1 provides an overview of a system and a related procedure in accordance with the inventive arrangements disclosed herein by way of a block diagram. The procedure starts with a realization 10, preferably an audio recording of human speech, i.e. a spoken text, and a representation 20, preferably a transcription of the spoken text. Many pairs of an audio realization and a true transcript (resulting from a correct transcription) are publically available, e.g. radio features stored on a storage media such as CD-ROM and the corresponding scripts, or audio versions of text books primarily intended for teaching blind people.

The realization 10 is first input to a speech recognition engine 50. The textual output of the speech recognition engine 50 and the representation 20 are aligned by means of an aligner 30. The aligner 30 is described in greater detail with reference to FIG. 2. The output of the aligner 30 is passed through a classifier 40. The classifier 40 is described in greater detail with reference to FIG. 3. The classifier compares the aligned representation with a transcript produced by the speech recognition engine 50 and tags all isolated single word recognition errors. An exemplary data set is depicted in FIG. 5.

In a first embodiment of the present invention, a selector 60 can select all one word pairs for which the representation and the transcript are different (see also FIG. 6). The selected words, together with their corresponding audio signal, are then used to update a word database. In a second embodiment, word pairs for which the representation and the transcript are similar, are selected for further processing. The selected words, together with their corresponding audio signal, are then used in the second embodiment to update a pronunciation database of a speech recognition system.

Figure 2:
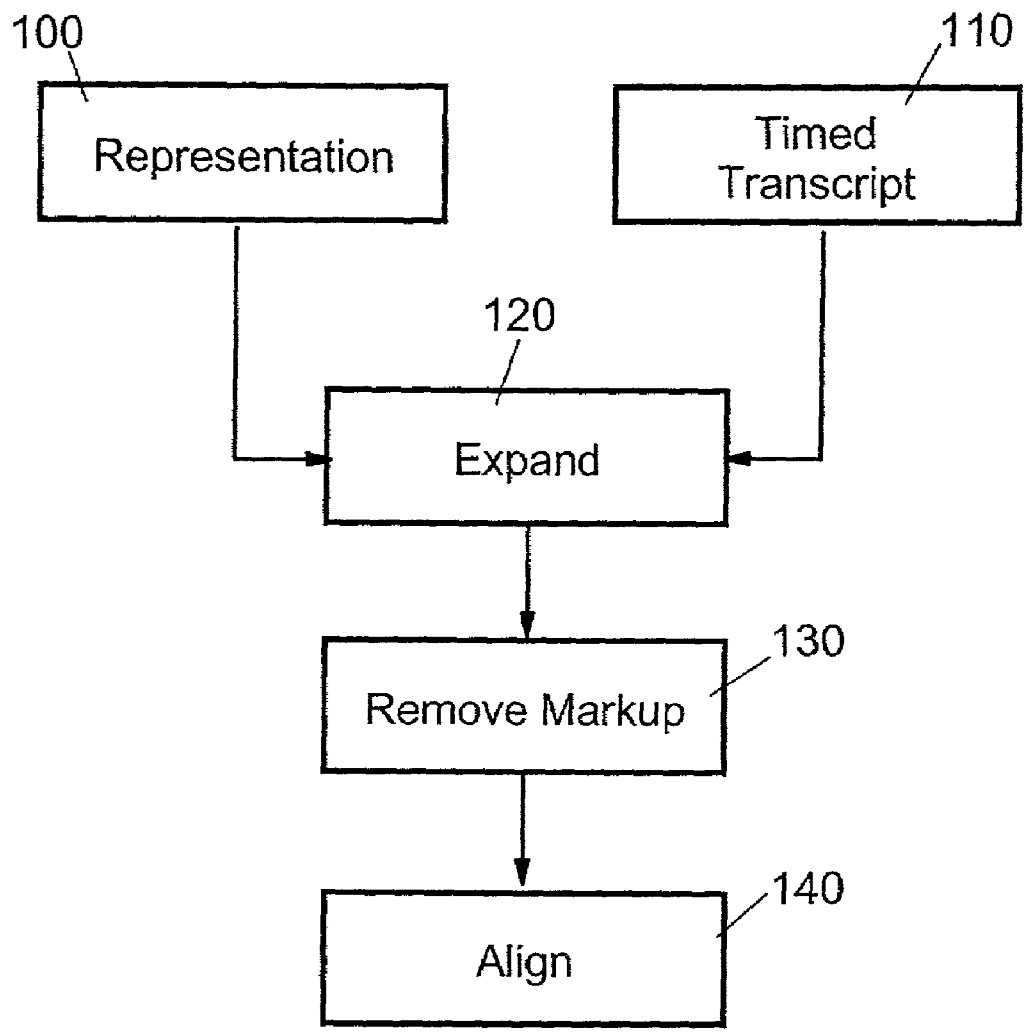
FIG. 2 is a block diagram of an aligner configured to align a true textual representation and a hypothesis timed transcript in accordance with the inventive arrangements disclosed herein.

Referring to FIG. 2, an aligner can be used by the present invention to align a true representation 100 and a hypothesis timed transcript 110. In a first step 120, acronyms and abbreviations can be expanded. For example, short forms like 'Mr.' are expanded to the form 'mister' as they are spoken. In a second step all markup is stripped 130 from the text. For plain ASCII texts, this procedure removes all punctuation marks such as ";", ",", ".", and the like. For texts structured with a markup language, all the tags used by the markup language can be removed. Special care can be taken in cases where the transcript has been generated by a SRS system, as is the case in the method and system according to the present invention working in dictation mode. In this case, the SRS system relies on a command vocabulary to insert punctuation marks which have to be expanded to the words used in the command vocabulary. For example, "." is replaced by "full stop".

After both texts, the time-tagged transcript generated by the SRS and the representation, have been "cleaned" or processed as described above, an optimal word alignment 140 is computed using state-of-the-art techniques as described in, for example, Dan Gusfield, "Algorithms on Strings, Trees, and Sequences", Cambridge University Press Cambridge (1997). The output of this step is illustrated in FIG. 5 and includes 4 columns. For each line, 600 gives the segments of the representation that aligns with the segment of the transcript 610. 620 provides the start time and 630 provides the end time of the audio signal that resulted in the transcript 610. It should be noted that due to speech recognition errors the alignment between 610 and 620 is not 1—1 but m-n, i.e. m words of the realization may be aligned with n words of the transcript.

Figure 3:
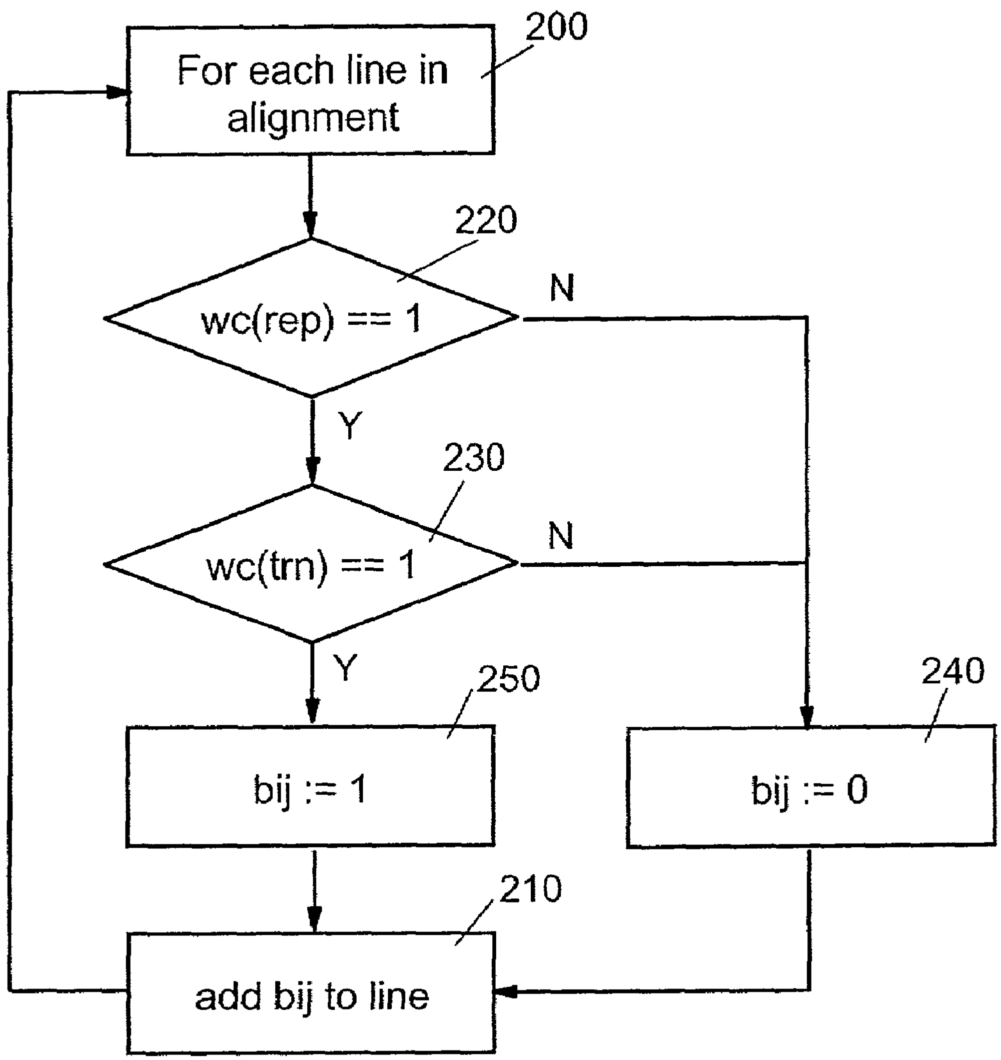
FIG. 3 is a block diagram of a classifier configured to process the output of the aligner of FIG. 2 in accordance with the inventive arrangements disclosed herein.
Figures 4, 5:
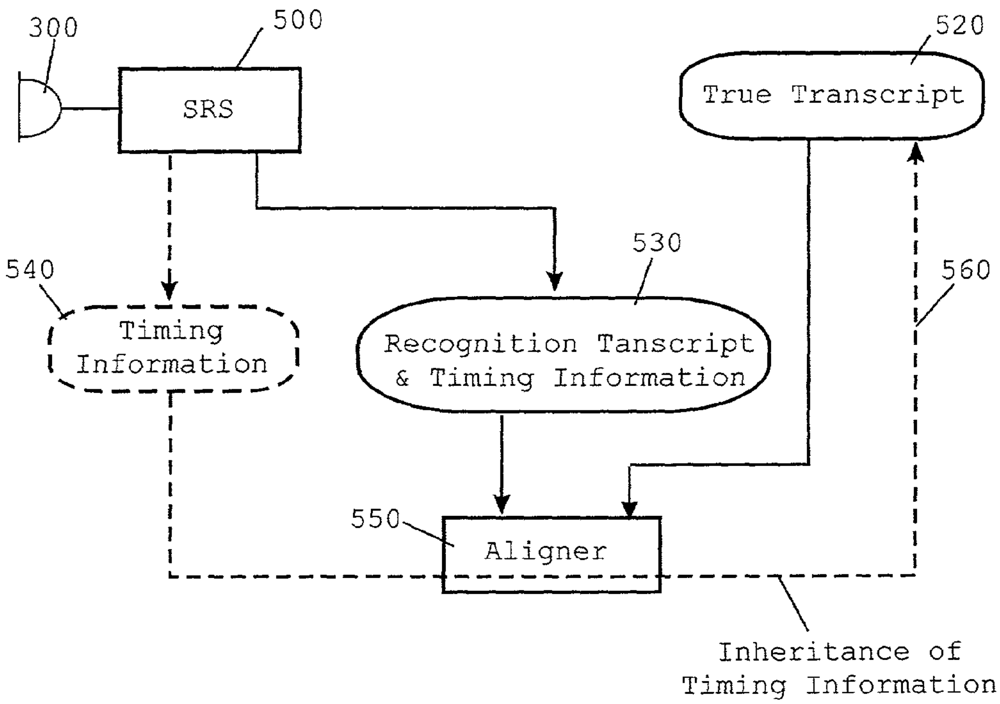
FIG. 4 is a block diagram illustrating inheritance of timing information in a system in accordance with the inventive arrangements disclosed herein.
FIG. 5 is an exemplary data set consisting of a true transcript, a hypothesis transcript provided through speech recognition, and a corresponding timing information output from an aligner in accordance with the inventive arrangements disclosed herein.

FIG. 3 is an overview block diagram of the classifier that processes the output of the aligner described above. For all lines 200 in FIG. 5, the classifier adds 210 an additional entry in column 740 as shown in FIG. 6. The entry specifies whether the correspondence between the representation and the transcript is 1—1. For each line of the aligner output, the classifier tests 220 whether the entry consists of one word. If this is not true, the value '0' is added 240 in column 740 and the next line of the aligner output is processed. If the entry in column 700 consists only of one word, the same test 230 is applied to the entry in column 710. If this entry also consists only of one word, the value '1' is added 250 in column 740. Otherwise the value '0' is written in 740.

FIG. 4 is a block diagram illustrating the inheritance of timing information in a system in accordance with the inventive arrangements disclosed herein. An audio realization, in the present embodiment, is input real-time to a SRS 500 via microphone 510. Alternatively, the audio realization can be provided offline together with a true transcript 520 which already has been checked for correctness of the assumed preceding transcription process. It is further assumed that the SRS 500 reveals a timing information for the audio realization. Thus, the output of the SRS 500 is a potentially correct transcript 530 which includes timing information and the timing information 540 itself which can be accessed separately from the recognized transcript 530.

The original audio realization recorded by the microphone 510 together with the true transcript 520 can be provided to an aligner 550. A typical output of an aligner 30, 550 is depicted in FIG. 5. It reveals text segments of the true transcript 600 and the recognized transcript 610 together with time stamps representing the start 620 and the stop 630 of each of the text segments. It is emphasized that one part of the text segments such as "ich" or "wohl" can consist of a single word for both transcripts 600 and 610, while other parts include multiple words such as "das tue" or "festzuhalten Fuehl".

For the text sample shown in FIG. 5, the corresponding output of a classifier according to the present invention is depicted in FIG. 6. The classifier can check the lines of the two transcripts 700 and 710 (corresponding to 600 and 610 respectively) for text segments that contain identical or similar isolated words and tags 740. Notably, for similar single words such as "Wahn" and "Mann" in columns 720 and 730 respectively, the corresponding line is tagged with a "1" bit. The tag information in column 740 can be used differently in accordance with the following two embodiments of the invention.

In a first embodiment of the invention illustrated in FIG. 7, a basic vocabulary of a SRS automatically can be updated. The update, for instance, can be a vocabulary extension of a given domain or supplement of a completely new domain vocabulary to an existing SRS. For example, a domain such as radiology corresponding to the medical treatment field can be added. The proposed mechanism selects lines of the output of the classifier (FIG. 7) which include a tag bit of "1", but include only non-identical single words such as "Wahn" and "Mann" in the present example. These single words represent single word recognition errors of the underlying speech recognition engine, and therefore can be used in a separate step to update a word database of the underlying SRS.

A second embodiment of the present invention, as illustrated in FIG. 8, provides for an automated speaker related adaptation of an existing vocabulary which does not require active training through the speaker. Accordingly, only single words where the tag bit equals "1" are selected for which the true transcript (left column) and the recognized transcript (right column) are identical (FIG. 8). These single words represent correctly recognized isolated words and thus can be used in a separate step to update a pronunciation database of an underlying SRS having phonetic speaker characteristics stored therein.

What is claimed is:

1. A method of automatically updating a word database and a pronunciation database used by a speech recognition engine to convert speech utterances to text, the method comprising:

taking a realization of spoken audio and a first representation that is an allegedly true textual representation for said realization;

generating a second representation by performing speech recognition on said realization using the word database, said second representation being a time-based transcription of said realization;

expanding said first and second representations to convert each acronym and abbreviation contained in said first and second representations to a speech equivalent;

processing the first representation to remove all markup language tags;

generating a line-by-line output by aligning said first representation and said second representation based on timed intervals derived from the time-based transcription of said realization, each line matching a segment of said first representation and a corresponding segment of said second representation for a particular one of the timed intervals;

detecting and marking each line of output that comprises a one-word segment of said first representation and a one-word segment of said second representation;

for each marked line of output whose one-word segment of said first representation and one-word segment of said second representation are similar, automatically updating said pronunciation database to include said similar one-word segments and a corresponding portion of said spoken audio; and for each marked line of output whose one-word segment of said first representation and one-word segment of said second representation are dissimilar, automatically updating said word database to include said dissimilar one-word segments and a corresponding portion of said spoken audio.

2. The method of claim 1, further comprising obtaining said first representation by optical character recognition using an optical character recognition device.

3. The method of claim 1, wherein the word database comprises a speaker-dependent database used to adapt the speech recognition to a particular speaker.

4. The method of claim 1, further comprising comparing a recognition quality of said speech recognition of said realization with a recognition quality of a corresponding single-word entry existing in said pronunciation database.

5. A method of automatically updating a word database and a pronunciation database used by a speech recognition engine to convert speech utterances to text, the method comprising:

taking a realization of spoken audio and a first representation that is an allegedly true textual representation for said realization;

producing a second representation that is a textual representation of said realization by performing a speech recognition on said realization using the word database;

expanding said first and second representations to convert each acronym and abbreviation contained in said first and second representations to a speech equivalent;

generating a line-by-line output by aligning said first representation and said second representation, each line of said output comprising a segment of said first representation, a segment of said second representation, and a time indicator indicating a start time and end time of said segments;

detecting and marking each line of output that comprises a one-word segment of said first representation and a one-word segment of said second representation;

for each marked line of output whose one-word segment of said first representation and one-word segment of said second representation are similar, automatically updating said pronunciation database to include said similar one-word segments and a corresponding portion of said spoken audio; and for each marked line of output whose one-word segment of said first representation and one-word segment of said second representation are dissimilar, automatically updating said word database to include said dissimilar one-word segments and a corresponding portion of said spoken audio.

6. The method of claim 5, further comprising obtaining said first representation by optical character recognition using an optical character recognition device.

7. The method of claim 5, wherein the word database comprises a speaker-dependent database used to adapt the speech recognition to a particular speaker.

8. The method of claim 5, further comprising comparing a recognition quality of said speech recognition of said realization with a recognition quality of a corresponding single-word entry existing in said pronunciation database.

9. A system for automatically updating a word database and a pronunciation database, the system comprising:

an audio device for taking a realization of spoken audio;

an text, reader for taking a first representation that is an allegedly true textual representation of said realization;

a speech recognizer that performs a speech recognition on said realization to generate a second representation from said realization, said second representation being a time-based transcription of said realization;

a word database used by the speech recognizer to perform speech recognition tasks;

an expander that expands said first and second representations to convert each acronym and abbreviation contained in said first and second representations to a speech equivalent;

an aligner configured to generate a line-by-line output by aligning said first representation and said second representation based on timed intervals derived from the time-based transcription of said second representation, each line matching a segment of said first representation and a corresponding segment of said second representation for a particular one of the timed intervals;

a classifier configured to detect and mark each line of output that comprises a one-word segment of said first representation and a one-word segment of said second representation; and a selector that for each marked line of output whose one-word segment of said first representation and one-word segment of said second representation are similar, automatically updates said pronunciation database to include said similar one-word segments and a corresponding portion of said spoken audio, and for each marked line of output whose one-word segment of said first representation and one-word segment of said second representation are dissimilar, automatically updates said word database to include said dissimilar one-word segments and a corresponding portion of said spoken audio.

10. The system of claim 9, wherein the text reader comprises an optical character reader.

11. A machine-readable storage, having stored thereon a computer program having a plurality of code sections executable by a machine for causing the machine to perform the steps of:

taking a realization of spoken audio and a first representation that is an allegedly true textual representation for said realization;

generating a second representation by performing speech recognition on said realization using the word database, said second representation being a time-based transcription of said realization;

expanding said first and second representations to convert each acronym and abbreviation contained in said first and second representations to a speech equivalent;

processing the first representation to remove all markup language tags;

generating a line-by-line output by aligning said first representation and said second representation based on timed intervals derived from the time-based transcription of said second representation, each line matching a segment of said first representation and a corresponding segment of said second representation for a particular one of the timed intervals;

detecting and marking each line of output that comprises a one-word segment of said first representation and a one-word segment of said second representation;

for each marked line of output whose one-word segment of said first representation and one-word segment of said second representation are similar, automatically updating a pronunciation database to include said similar one-word segments and a corresponding portion of said spoken audio; and for each marked line of output whose one-word segment of said first representation and one-word segment of said second representation are dissimilar, automatically updating a word database to include said dissimilar one-word segments and a corresponding portion of said spoken audio.

12. The machine-readable storage of claim 11, further comprising a machine-executable code section to perform the step of obtaining said first representation by optical character recognition using an optical character recognition device.

13. The machine-readable storage of claim 11, wherein the word database comprises a speaker-dependent database used to adapt the speech recognition to a particular speaker.

14. The machine-readable storage of claim 11, further comprising a machine-executable code section to perform the step of comparing a recognition quality of said speech recognition of said realization with a recognition quality of a corresponding single-word entry existing in said pronunciation database.

15. A machine-readable storage, having stored thereon a computer program having a plurality of code sections executable by a machine for causing the machine to perform the steps of:

taking a realization of spoken audio and a first representation that is an allegedly true textual representation for said realization;

producing a second representation that is a textual representation of said realization by performing a speech recognition on said realization using the word database;

expanding said first and second representations to convert each acronym and abbreviation contained in said first and second representations to a speech equivalent;

generating a line-by-line output by aligning said first representation and said second representation, each line of said output comprising a segment of said first representation, a segment of said second representation, and a time indicator indicating a start time and end time of said segments;

detecting and marking each line of output that comprises a one-word segment of said first representation and a one-word segment of said second representation;

for each marked line of output whose one-word segment of said first representation and one-word segment of said second representation are similar, automatically updating a pronunciation database to include said similar one-word segments and a corresponding portion of said spoken audio; and for each marked line of output whose one-word segment of said first representation and one-word segment of said second representation are dissimilar, automatically updating a word database to include said dissimilar one-word segments and a corresponding portion of said spoken audio.

16. The machine-readable storage of claim 15, further comprising a machine-executable code section to perform the step of obtaining said first representation by optical character recognition using an optical character recognition device.

17. The machine-readable storage of claim 15, wherein the word database comprises a speaker-dependent database used to adapt the speech recognition to a particular speaker.

18. The machine-readable storage of claim 15, further comprising a machine-executable code section to perform the step of comparing a recognition quality of said speech recognition of said realization with a recognition quality of a corresponding single-word entry existing in said pronunciation database.

* * * * *